_United States Patent Office_

3,350,345
Patented Oct. 31, 1967

3,350,345
BONDED RUBBER-SILICEOUS MATERIALS AND PROCESS OF PRODUCING SAME
Byron M. Vanderbilt and Robert E. Clayton, Westfield, N.J., assignors to Esso Research and Engineering Company, a corporation of Delaware
No Drawing. Filed Dec. 21, 1962, Ser. No. 246,337
26 Claims. (Cl. 260—41.5)

The present invention relates to a method for bonding rubbery polymers and copolymers to siliceous surfaces, i.e., surfaces such as glass fiber, comminuted or finely divided silicas, aluminas, and certain types of silicates.

More particularly, the invention relates to the use of partially hydrolyzed esters of hydrocarbon substituted silanes. These partially hydrolyzed silanes surprisingly have been found to give unique advantages, both from the processing standpoint and from strength properties of the reinforced rubbery compositions which have heretofore not been attained.

In the past, it has been customary to employ the various unsaturated alkyl silanes as bonding agents for improving the adhesion between silica fillers or glass fibers and either resinous compositions or rubbery polymeric compositions. Substituted silanes, such as gamma aminopropyl silane, are applied to the siliceous surfaces as an aqueous solution of the silanol. However, such solutions condense to the polysiloxane forms and some coagulation may occur resulting in poor coatings of the fillers or fibers. If, on the other hand, an anhydrous silane ester is employed, i.e., a silicon compound containing no OH group attached to the silicon, the bond between the silane and the siliceous surface is not as complete as would be desired. Additionally, the unhydrolyzed silanes are, in many instances, too volatile, and a direct application of such silanes to the siliceous surfaces results in a substantial amount of the material volatilizing off the siliceous surface, thus losing effectiveness in securing good adhesion. If a hydrocarbon solvent solution of the silane is employed, the same problem is present in that usually the silane volatilizes at the same time that the solvent is volatilized or removed. It was therefore desirable to attempt to employ a silane in such modified form that it is readily attached to the siliceous surface forming a good intermediate bond for subsequent treatment with resinous or rubbery polymers and copolymers. At the same time it should adhere to the siliceous surface and not be volatilized before it has had an opportunity to effect a common adhesive bond between the siliceous surface and the polymer or copolymer.

A solution of this problem has been surprisingly enough obtained through the partial hydrolysis of silanes so that the silicon atom in a silane molecule has directly attached to it at least one alkoxy group and at least one hydroxyl group.

The type of silanes employed as starting materials and which are subsequently partially hydrolyzed are of the general formula:

(I) 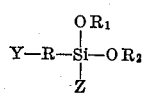

wherein R is selected from the group consisting of alkylene, aralkylene and arylene, Y is a reactive radical selected from the group consisting of amino, mercapto, carboxyl, cyano, hydroxy, epoxy, quinonyl, sulfonic acid and oxime, $R_1$ and $R_2$ are alkyl radicals and may be the same as each other or different, Z is selected from the group consisting of alkyl, OR, or $OR_2$ wherein $R_1$ and $R_2$ are as above defined. The compounds which are produced by the hydrolysis are, in fact, mixtures of several compounds, but the primary constituent which is effective in the present invention is believed to have the following formula:

(II) 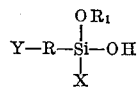

wherein R is selected from the group consisting of alkylene, aralkylene and arylene, Y is a reactive radical selected from the group consisting of amino, mercapto, carboxyl, cyano, hydroxy, epoxy, quinonyl, sulfonic acid and oxime, $R_1$ is an alkyl radical, and X is selected from the group consisting of OH, alkyl, or alkoxy. As typical examples of silanes which may be employed as the starting materials, i.e., the silanes which are to be partially hydrolyzed, the following are representative: Gamma-amino-propyl triethoxysilane, beta-amino-ethyl triethoxysilane, amino-methyl triethoxysilane, amino-propyl trimethoxysilane, diamino-propyl diethoxysilane, delta-amino-butyl triethoxysilane, N-beta-aminoethyl gamma-amino beta-methyl propyl trimethoxysilane, beta-aminoethyl-N-gamma-aminopropyl trimethoxysilane, gamma-mercaptopropyl triethoxysilane, beta-amino-ethyl methyldiethoxysilane, amino-propyl dimethylethoxysilane, alpha-aminopropyl triethoxysilane, beta-amino-propyl triethoxy-silane, beta-cyano-ethyl triethoxysilane, ethyloltriethoxy-silane, beta-mercapto-ethyl triethoxy silane, and the like. The most readily commercially available compounds usually are of the triester type. But either the di- or triester silanes are useable in practicing the present invention, for the reason that it is only necessary that the ultimate partially hydrolyzed compound finally contain at least one OH group and at least one alkoxy group directly attached to the silane atom in order to satisfy the physical and chemical requirements of the present invention.

The partially hydrolyzed silanes as set forth in Formula II are obtained from the silane esters as represented by the above Formula I by carefully controlling the relative amounts of silane ester and water so as to insure that no more water is present than is stoichiometrically required to hydrolyze at least one but not all of the alkoxy groups shown in Formula I. Thus, for example, if a triethoxy silane is employed, no more than about 2 mols of water per mol of silane is employed in the hydrolysis operation and if a diethoxy silane is used, no more than about 1⅓ mols of water are employed per mol of silane. The hydrolysis takes place at room temperature slowly but this is accelerated if the substituted group is alkaline such as an amino, or acidic such as in the case of a carboxyl or a sulfonyl group.

It is indeed surprising that the partially hydrolyzed silane in concentrated form does not condense rapidly to polysiloxanes and precipitate out as solid aggregates as in the case when using aqueous solutions of completely hydrolyzed silane esters. Such partially hydrolyzed silanes have stood for months and still remain clear liquids. Such silanols dissolved in organic solvents also remain clear and free of precipitate. The initial hydrolysis is carried out by adding the desired amount of water to the alkoxy silane. In view of the fact that the silane has a reactive group (Y in the above formula), this accelerates the hydrolysis as compared to the hydrolysis of the corresponding unsubstituted silane. In many cases, a precipitate may form shortly after adding the water, but this disappears on further standing. Minimum contact must allow the water to react and dissolve in the silane. No turbidity should result when the silane so treated is dissolved in a hydrocarbon solvent such as benzene. Mixtures with no more than the stoichiometrically required amount of water will stay clear and free of precipitate for periods up to a least 6 months. However, slight turbidity of the solution results at the end of about 6 months and this has been interpreted to mean that some siloxanes have formed. For the most part, however, the silane esters containing the reactive group Y are hydrolyzed to a high degree, while the mixture remains soluble in organic solvents if storage periods for the concentrate, of no longer than about 3 or 4 months are avoided. For practical commercial operations, solutions which have hydrolyzed for about 1 hour at room temperature will contain a sufficient amount of the partially hydrolyzed silane, such as represented by Formula II, to work effectively as bonding agents in accordance with the technique of the present invention. Glass fibers or silica fillers are best contacted with partially hydrolyzed silane esters by employing one or more normally liquid hydrocarbon solvents, such as the following: aromatic hydrocarbons such as Solvesso 100, which has a boiling point between about 320° and 350° F., toluene, xylene, alcohols such as isopropyl alcohol and secondary butanol, ketones, such as acetone, methyl ethyl ketone, and chlorinated hydrocarbons such as chloroform, carbon tetrachloride, and ethylene dichloride. Anhydrous conditions obviously are employed in contacting the partially hydrolyzed silanes with the siliceous surfaces. Obviously, too, the solvents must be anhydrous and high humidity conditions will have to be avoided, both with respect to the siliceous surfaces and the organic solvent solution of the partially hydrolyzed silane. Additionally, if glass fibers, for example, are being produced in the form of rovings, strands, and the like, a sizing or binder may be applied to these fibers so that the organic solution of the partially hydrolyzed silane esters will have added to it such polymeric binders as polyvinyl acetate, then unsaturated polyesters of the conventional polyols with unsaturated dicarboxylic acids or their anhydrides, or may be used in conjunction with the normally liquid polymers of butadiene or the copolymers of butadiene with small amounts of styrene, other monovinyl monomers, tricresyl phosphate, or rubbery polymers such as ethylene-propylene rubber.

The fillers and reinforcing agents of silicates, silica and the like may be of many varied types, such as clays, for example kaolin, bentonite, coarsely ground and finely grounnd silicas, such as quartz, hydrated silica (Hi-Sil 233), fumed silica (Cab-O-Sil). Ground quartz is also applicable as well as diatomaceous earth (Celite 270), hydrous magnesium silicate (talc), hydrous aluminum magnesium silicate (chlorite), hydrous calcium magnesium silicate (tremolite), hydrated sodium silico aluminate (Zeolex 23), and calcium silicate (Silene EF). Glass fibers, in the form of filaments, yarns, rovings, strands, matts, staple yarns, woven fibers, woven rovings, cord and chopped rovings, ceramics and porcelains are also suitable reinforcing agents and fillers and come within the scope and definition of "siliceous surfaces" as used herein and in the claims.

As previously stated, the partially hydrolyzed silanes are applied to the siliceous surfaces in the form of anhydrous solutions in which the concentration of partially hydrolyzed silane is of the order of between about 0.1 and about 10.0%, preferably between about 0.5 and about 2%, partially hydrolyzed silane in the organic solvent. By "substantially anhydrous" is meant that no more than about 0.5% moisture is present, but it is distinctly understood that the nearer one approaches complete anhydrous conditions, the better the results, for the reason that it is desired to avoid, insofar as possible, any opportunity for the previously partially hydrolyzed silane to become completely hydrous, since much of the effectiveness of the invention is lost if all or a portion of the silane becomes completely hydrolyzed. This is not to say, however, that in any particular solution, prepared by the previously described partial hydrolysis process, some amounts of completely hydrolyzed silane, together with the condensation products of such completely hydrolyzed silane, will not be formed. However, the conditions employed, principally the control of the amount of water present, are so chosen as to minimize the formation of the complete hydrolysis products of the silane esters.

The treated siliceous surfaces upon drying and substantially freeing the same of solvent, which drying is carried out at temperatures between about 50° F. and about 1000° F., are then employed as fillers or fibrous reinforcing agents in conjunction with synthetic or natural rubber. Among the rubbers which can be employed and which can be filled or reinforced with the treated siliceous materials are the following: butyl rubber and the halogenated butyl rubbers, such as chlorinated butyl and brominated butyl, polychloroprene ("neoprene"), natural rubber, polyisoprene, rubbery polybutadiene, butadiene-stryene rubbery copolymers, such as described in U.S. Patent 1,938,730, the butadiene-acrylonitrile rubbery copolymer as described in U.S. Patent 1,973,000, one of which is sold under the trade name "Paracril" and ethylene-proplyene rubbery copolymer, polyurethane rubbers, polysulfide rubbers (Thiokol), chlorosulfonated polyethylene (Hypalon), and mixtures thereof.

In compounding and masticating rubber batches separately to fill them with the siliceous fillers or reinforcing them with the glass fibers, the usual and conventional antioxidants, plasticizers, accelerators, curing or vulcanizing agents and the like, are also employed. Conventional times and temperatures are also employed. In general, sulfur and/or peroxide curing agents are employed. The peroxides which can be readily employed are one or more of the following: Dicumyl peroxide; 2,5-dimethyl-2,5-di-(tertiary butyl peroxy) hexane; 2,5-dimethyl-2,5-di-(tertiary butyl peroxy)-hexyne-3; ditertiary butyl peroxide, benzoyl peroxide, and the like. Vulcanization accelerators are also conventionally, used, either with the peroxide or sulfur cures. The siliceous substances, if in the form of fillers, are incorporated into the rubber matrix by the use of a Banbury mixer or other conventional mixing equipment so that a uniform mix is achieved prior to the curing step. In the incorporation of glass fiber reinforcements, the masticated rubber composition is placed in intimate contact with the glass cloth, glass cord, or other glass structure and is cured by conventional means such as press curing, open steam curing, air pressure curing, oven curing, dielectric curing, induction curing, and the like and occasionally may even be cured under ambient conditions usually referred to as room temperature curing. The curing temperatures may be between 75° and 400° F., preferably between 300° and 330° F. and the curing time from 3 minutes to 3 days, preferably from 10 to 60 minutes. The pressure of cure, both in the case of the glass fiber reinforcement operation and in the case of siliceous fillers is carried out under a pressure ranging conventionally between about 0 and about 1,000 p.s.i.g., preferably between about 50 and 600 p.s.i.g. Both natural and synthetic rubbers are employed and their methods of compounding are conventional in the art. The essence of the instant invention resides in the treatment of the siliceous surfaces, which are to be used as reinforcing agents or fillers for the various rubbers, with a partially hydrolyzed silane ester in order to improve the adhesion and bond between the surfaces of the siliceous materials and the rubber adjacent to and in contact with these surfaces. Additives, curing techniques, vulcanization agents and accelerators, as well as antioxidants, customarily employed in processing these rubbers, are employed in the instant invention. No particular novelty in such substances and procedures is asserted except insofar as such conventional procedures and substances are employed in combination with the partially hydrolyzed silane ester pretreatment and the siliceous surfaces employed as fillers and reinforcing agents in combination with the rubbers employed. The partially hydrolyzed silanes may also be added dissolved or dispersed in the rubbers instead of, or in addition to, their use for pretreating the siliceous surfaces.

The useful articles which can be produced are those which have customarily employed siliceous fillers or glass fibers as reinforcing agents. These new products having improved bonding strength between the siliceous surfaces and the rubbers are of course used in making hose, rubbery belting, automobile tires, aircraft tires, etc. wherein a strong bond between the filler or reinforcing agents and the rubber is required. The invention resides in the novel techniques by which an improved bond is obtained between the siliceous surface and the rubber surface.

The following examples are set forth for the purposes of illustration only and unless otherwise indicated all parts and percentages are stated on a weight basis.

Example 1

9 grams of water (0.5 mol) were dissolved at room temperature in 110.5 grams of anhydrous gamma amino propyl triethoxy silane (0.5 mol) to give a clear solution. The temperature of the solution, upon the addition of the water increased about 10° F. and a heavy white gelatinous precipitate formed. After about one hour of standing the precipitate decreased in quantity and within two hours after the water addition, the mixture was clear and free of precipitate. The same solution, after standing at room temperature for 6 months, was still clear and free of precipitate.

A 1.4% solution of anhydrous gamma-aminopropyl triethoxysilane dissolved in anhydrous isopropyl alcohol was applied to samples of heat-cleaned glass fabric of taffeta weave sold as HG 28/112 by Hess, Goldmith & Co., Inc. One sample was allowed to dry (sample No. 1) at room temperature and a second sample was allowed to dry at 220° F. for 30 minutes (sample No. 2) through the use of hot air. Two additional samples of the heat-cleaned HG-28 glass were treated or impregnated with a 1.5% solution in isopropyl alcohol of the previously described equimolar amounts of gamma-aminopropyl triethoxysilane reacted with water and which had stood at room temperature for 1 month. These samples were likewise dried at room temperature (sample No. 3) and with hot air at 220° F. for 30 minutes (sample No. 4). These four samples of treated glass cloth were then each sandwiched between two layers (each about 0.095" thick) of a compounded rubber composition having the following ingredients and in the amounts shown:

| | |
|---|---|
| Paracril C [1] | 100 |
| SRF black | 50 |
| Magnesium oxide | 3 |
| Zinc oxide | 5 |
| Stearic acid | 1 |
| Aminox [2] | 0.5 |
| Dibutyl phthalate | 15 |
| Sulfur | 1 |
| Tetramethyl thiuram monosulfide | 0.6 |

[1] Paracril C is a rubbery copolymer composed substantially of about 35 wt. percent acrylonitrile and 65 wt. percent butadiene.
[2] Aminox is a low temperature reaction product of diphenylamine and acetone sold as an antioxidant.

This assembly was in turn sandwiched between canvas for the purpose of backing so that the rubber composition is strengthened such that it can be severely pulled and tugged in testing to determine the force necessary to pull the rubber away from the glass fabric. A piece of Mylar (polyethylene terephthalate resin film) was inserted at one end of the sample between the rubber and glass fabric to provide an opening for the start of subsequent adhesion tests. The four sandwiched samples were then press cured 15 minutes at 307° F. under 500 p.s.i.g. in a heated mold. One-inch wide specimens were than cut out of the sample for strip adhesion tests which were run on an Instron tester at a jaw separation rate of 2 inches per minute, with the following results.

| Sample No.: | Lbs. of pull/in. |
|---|---|
| 1 | 29 |
| 2 | 14 |
| 3 | 60 |
| 4 | 63 |

It will be observed that the partially hydrolyzed amino alkyl triethoxy silane exhibited more than twice the adhesion and tenacity of contact of the samples employing anhydrous amino alkyl triethoxy silane. Additionally, the adhesion values for the partially hydrolyzed silane treated glass cloth exceeded the adhesion values of 39 obtained with the use of similar HG 28 weave glass to which the gamma-aminopropyl triethoxysilane was commercially applied from aqueous solution. The relatively low values obtained, upon treating with the anhydrous silane, apparently are due in part to the loss of silane during the evaporation of the isopropyl alcohol solvent, because the adhesion value was the lowest for the cloth dried at 220° F., indicating that more vaporization of the silane took place by such treatment. However, this is not the sole possible explanation since the cloth treated with the partially hydrolyzed silane was also superior to the commercially treated glass cloth so far as adhesion value was concerned.

Example 2

The same procedure as set forth in Example 1 was repeated except that the partially hydrolyzed silane was only allowed to stand for 5 days prior to use, and the partially hydrolyzed silane was applied as a 1.5% solution in anhydrous methyl ethyl ketone and allowed to dry at room temperature. Comparison samples were prepared using the heat cleaned HG-28 glass cloth which had subsequently been treated with partially hydrolyzed gamma aminopropyl triethoxysilane and with HG-28 glass cloth which had not been heat cleaned but contained a commercial glass finish. The last sample was a heat cleaned HG-28 glass cloth which was not subsequently treated with a silane finish of any kind. The adhesion test results were as follows:

| Sample No. | Treatment | Lbs. Pull/In. |
|---|---|---|
| 5 | Partially hydrolyzed silane finish | [1] 72+ |
| 6 | Commercial silane finish | 35 |
| 7 | No finish | 3 |

[1] The bond of the glass cloth to the rubber was stronger than the cured rubber itself.

Sample 5 shows that the nitrile rubber did not separate from the glass cloth that had been treated with the partially hydrolyzed silane, i.e., the strength of the bond to the treated glass was greater than the strength of the rubber composition. Control sample 6 shows that the commercial silane treatment resulted in good bond strength, nevertheless the strength was less than one-half that obtained in the case of sample 5. When the glass contained no finish, as in sample 7, the nitrile rubber was separated from the glass with a force of only 3 lbs./in., which probably represents merely the force required for a rubber-to-rubber separation at the close-woven fabric interstices.

Example 3

36 grams of water (2 mols) were dissolved in 221 grams (1 mol) of gamma aminopropyl triethoxysilane. The mixture was allowed to stand in a closed container for 5 days. It was noted that the heavy precipitate which originally formed disappeared permanently after 16 hours to give a clear, viscous liquid. A 1.4% solution of this partially hydrolyzed product was dissolved in anhydrous methyl ethyl ketone and was applied to HG-28 heat cleaned glass cloth, one set of samples being treated at room temperature and the other set of samples being dried with hot air at 220° F. for 30 minutes. Samples of these treated cloths, as well as a cloth purchased having a commercial finish of gamma-aminopropyl triethoxysilane were sandwiched between layers of the following rubber composition and made up with Mylar film as fully described in Example 1. They were then cured in a press mold at 320° F. for 20 minutes at a pressure of 500 p.s.i.g. The rubber composition employed was as follows:

| | Parts |
|---|---|
| Neoprene W | 100 |
| Magnesium oxide | 4 |
| FT black | 50 |
| Stearic acid | 0.5 |
| Aminox [1] | 0.5 |
| Zinc oxide | 5 |
| Dibutyl phthalate | 15 |

[1] An antioxidant—a low temperature reaction product of diphenylamine and acetone.

| Sample No. | Treatment | Lbs. Pull/In. |
|---|---|---|
| 8 | Partially hydrolyzed silane dried at room temperature. | [1] 63+ |
| 9 | Partially hydrolyzed silane dried at 220° F. | [1] 70+ |
| 10 | Commercial silane finish. | 12 |

[1] Glass to rubber bond proved to be stronger than the rubber itself.

*Example 4*

A 1.4% solution of gamma-aminopropyl triethoxysilane in anhydrous methyl ethyl ketone was applied to heat cleaned glass cloth of HG–28 weave and the sample dried at room temperature. Another sample was similarly prepared except that the silane used was the partially hydrolyzed product described in Example 3. Specimens of these treated cloths were sandwiched between layers of the following rubber compositions and made up with Mylar film as fully described in Example 1. They were then cured in a press mold at 307° F. and 500 p.s.i.g. pressure for the times shown in the following along with the adhesion test data obtained in the manner described in Example 1.

| | A | B |
|---|---|---|
| SBR-1500 [1] | 100 | |
| Enjay EPR-404 [2] | | 100 |
| SRF Black | 50 | 50 |
| Magnesium Oxide | 3 | |
| Zinc Oxide | 5 | |
| Stearic Acid | 1 | 1 |
| Flexon 765 [3] | 10 | |
| Sulfur | 2 | 0.25 |
| 2-Mercaptobenzothiazole | 0.6 | |
| Diphenylguanidine | 0.5 | |
| Di-cup 40 HAF [4] | | 5 |
| Ethylene Dimethacrylate | | 5 |
| Minutes of Cure at 307° F | 15 | 50 |

[1] Styrene-butadiene rubber.
[2] Ethylene-propylene rubber:
   Mol percent ethylene _____ 54
   Mooney Viscosity (ML 212° F./8') _____ 40
[3] Flexon 765 is a hydrocarbon oil plasticizer sold by Humble Oil & Refining Co. The typical inspections of this oil are as follows:

Viscosity:
   SSU/100° F _____ 490
   SSU/210° F _____ 57.3
Aniline Point, ° F _____ 216
Specific Gravity/60° F _____ 0.899
Saturates, Wt. Percent _____ 78.3
Aromatics, Wt. Percent _____ 20.8
Polar Materials, Wt. Percent _____ 0.9
[4] 40% dicumyl peroxide supported on 60% HAF carbon black.

| Sample No. | Treatment | Lbs. Pull/In. | |
|---|---|---|---|
| | | A | B |
| 11A | Unhydrolyzed silane | 13 | |
| 11B | do | | 31 |
| 12A | Partially hydrolyzed silane | 19 | |
| 12B | do | | 40 |

This example shows that styrene-butadiene rubber and ethylene-propylene rubber can be bonded to glass which has been treated with aminoalkyl alkoxysilane and that preferred bonding strength is obtained when the aminoalkyl alkoxysilane has been partially hydrolyzed before being used to treat the glass.

*Example 5*

In the following comparative runs, the siliceous surface was quartz powder having an average particle size of about 17 microns. The silanes used in this example were unhydrolyzed gamma-aminopropyl triethoxysilane and its partially hydrolyzed product prepared as shown in Example 2. Untreated quartz powder (composition A) and treated quartz powder (compositions B and C obtained by treatment with unhydrolyzed and hydrolyzed silanes respectively, followed by drying) and the treated and untreated quartz powders were compounded into Paracril C, a rubbery composition of acrylonitrile-butadiene, by means of conventional rubber mill mixing technique. The compositions were press-cured in a 6″ x 6″ x 0.075″ mold for 20 minutes at 307° F. while under 500 p.s.i.g. pressure. Specimens known as tensile dumb bells were cut out of the resulting vulcanizates and tested on a Scott tester with jaw separation rate of 20 in./min. In other words, compound preparation and testing were all done under conventional conditions. Details of the compositions and test results are shiwn below:

| | A | B | C |
|---|---|---|---|
| Paracril C | 100 | 100 | 100 |
| Quartz Powder | 50 | 50 | 50 |
| Magnesium Oxide | 3 | 3 | 3 |
| Zinc Oxide | 5 | 5 | 5 |
| Stearic Acid | 1 | 1 | 1 |
| Sulfur | 1 | 1 | 1 |
| Tetramethyl Thiuram Monosulfide | 0.6 | 0.6 | 0.6 |
| Unhydrolyzed Silane | | 3 | |
| Partially Hydrolyzed Silane | | | 3 |
| Sample Number | 13A | 13B | 13C |
| Vulcanizate Properties: | | | |
|   Tensile strength, p.s.i | 435 | 885 | 1,060 |
|   Elongation, percent | 490 | 585 | 620 |
|   300% Modulus, p.s.i | 280 | 530 | 670 |
|   Tear, lb./in | 70 | 110 | 140 |

The tests show that the vulcanizate strength of composition A was improved when the unhydrolyzed silane was included as in B and that further improvement was obtained when the silane was partially hydrolyzed as in C.

Anhydrous organic solutions of the partially hydrolyzed silanes can be used to treat the siliceous filler powders by means of the methods previously described for the treatment of the fiber glass surfaces. When the silanes are used in such manner, they improve the ability of the siliceous fillers to reinforce the strength of rubbery compositions similarly to that described in this example. The siliceous powder may be pretreated with the silane before the powder is incorporated into the rubbery compound or the siliceous powder and the silane can be separately added to the rubbery compound which latter method generally should be the more economical.

*Example 6*

0.1 mol of water was reacted with 0.1 mol of silane to form 1/3 hydrolyzed silane products as follows:

AH—1.8 g. of distilled water was added dropwise to 24.74 g. of 3,4-epoxycyclohexylethyl trimethoxysilane. Throughout about one minute of observation, the water did not appear to react as judged by the fact that it remained in the form of various size droplets. However, upon shaking the mixture by hand for about one minute, the product was uniformly clear.

BH—1.8 g. of distilled water was added dropwise to 22.03 g. of glycidoxypropyl trimethoxysilane. As in the case of AH, the water did not appear to react until the mixture was shaken by hand for about one minute to form a uniformly clear product.

CH—1.8 g. of distilled water was added dropwise to 19.64 g. of gamma-mercaptopropyl trimethoxysilane. After shaking by hand for about one minute, the product was found to be slightly hazy. This slight haze remained uniform throughout 15.0 hours of observation and further shaking did not apparently alter its appearance.

DH—1.8 g. of distilled water was added dropwise to 22.14 g. of gamma-aminopropyl triethoxysilane. The mixture was shaken by hand for about one minute and a heavy white precipitate formed. Within two hours, the mixture was clear and free of precipitate.

Unhydrolyzed controls are given the following designations:

A—3,4-epoxycyclohexylethyl trimethoxysilane
B—glycidoxypropyl trimethoxysilane
C—gamma-mercaptopropyl trimethoxysilane
D—gamma-aminopropyl triethoxysilane The aforesaid partially hydrolyzed silanes and unhydrolyzed silane controls were applied to heat cleaned glass cloth of HG–28 weave as follows: The cloth was immersed for about one minute in a 1.7 wt. percent solution of the silane in benzene, and then the cloth was dried in air at room temperature.

Specimens of these treated cloths were sandwiched between layers of the following rubber compositions and made up with Mylar film as described in Example 1. They were then cured in a press mold at 307° F. and 500 p.s.i.g. pressure for the times shown in the following table:

|  | Neoprene | EPR | SBR |
|---|---|---|---|
| Neoprene W | 100 |  |  |
| Enjay EPR–404 [1] |  | 100 |  |
| SBR–1500 [1] |  |  | 100 |
| Fine Thermal Black | 50 |  |  |
| Semi-reinforcing Furnace Black |  | 50 | 50 |
| Magnesium Oxide | 4 |  | 3 |
| Stearic Acid | 0.5 | 1 | 1 |
| Aminox [2] | 0.5 |  |  |
| Dibutyl Phthalate | 10 |  |  |
| Zinc Oxide | 5 |  | 5 |
| Sulfur |  | 0.25 | 2 |
| Di-cup 40 HAF [1] |  | 5 |  |
| Ethylene Dimethacrylate |  | 5 |  |
| Flexon 765 [1] |  |  | 10 |
| 2-mercaptobenzothiazole |  |  | 0.6 |
| Diphenylguanidine |  |  | 0.5 |

[1] As described in Example 4.
[2] As described in Example 1.

The following adhesion test data were obtained in the manner described in Example 1.

| Sample No. | Treatment | Rubber Composition | Minutes of Cure | Adhesion, Lbs. Pull/In. |
|---|---|---|---|---|
| 14 | Partially Hydrolyzed Silane AH | Neoprene | 60 | 44 |
| 15 | Unhydrolyzed Silane A | do | 60 | 32 |
| 16 | Partially Hydrolyzed Silane AH | EPR | 60 | 65 |
| 17 | Unhydrolyzed Silane A | EPR | 60 | 53 |
| 18 | Partially Hydrolyzed Silane BH | SBR | 20 | 11 |
| 19 | Unhydrolyzed Silane B | SBR | 20 | 10 |
| 20 | Partially Hydrolyzed Silane CH | EPR | 40 | 53 |
| 21 | Unhydrolyzed Silane C | EPR | 40 | 45 |
| 22 | Partially Hydrolyzed Silane DH | SBR | 20 | 14 |
| 23 | Unhydrolyzed Silane D | SBR | 20 | 10 |

The above data illustrate several different silanes which can be used for coupling various rubbery polymer compositions to siliceous surfaces, and further illustrate that the silanes vastly enhance the adhesion of rubbers to siliceous surfaces when they are partially hydrolyzed.

*Example 7*

One-tenth mol of water was reacted with one-tenth mol of gamma-carboxypropyl trimethoxysilane to form the 1/3 hydrolyzed product as follows: 1.8 g. of distilled water was added to 20.83 g. of gamma-carboxypropyl trimethoxysilane and the mixture was stirred to complete the reaction. A 5 wt. percent solution of the aforesaid partially hydrolyzed silane in toluene was then prepared. A control was also prepared which consisted of a 5 wt. percent solution of gamma-carboxypropyl trimethoxysilane in toluene.

A rubbery composition to be used in the adhesion experiments was prepared according to the following recipe:

| | |
|---|---|
| Enjay Butyl HT–1066 [1] | 100 |
| Fine furnace black | 50 |
| Magnesium oxide | 2 |
| Stearic acid | 1 |
| Zinc oxide | 3 |
| Benzothiazyl disulfide | 2 |
| Tetramethyl thiuram disulfide | 1 |

[1] Chlorinated isobutylene-isoprene copolymer:
  Isobutylene, percent _____ 97.0.
  Isoprene, percent _____ 1.8.
  Chlorine, percent _____ 1.2.
  Molecular weight (viscosity average) __ About 375,000.

Heat cleaned glass cloth of HG–28 weave was sandwiched between layers (about 0.095″ thick) of the above rubbery composition and the assembly was made up with Mylar film as fully described in Example 1 with the following exceptions:

A. Before the sample was assembled, the rubber layers were brush-coated with the toluene solution of partially hydrolyzed gamma-carboxypropyl trimethoxysilane previously described in this example.
B. Like A except that the toluene solution of the unhydrolyzed silane was used.
C. In this case no brush coat was used, therefore, no coupling agent was present.

The samples were press cured for 50 minutes at 307° F. and 500 p.s.i.g. and were subsequently tested for adhesion in the manner described in Example 1. The test results where as follows:

| Sample No. | Treatment | Adhesion, Lbs. Pull/In. |
|---|---|---|
| 24 | Partially Hydrolyzed Silane | 45 |
| 25 | Unhydrolyzed Silane | 30 |
| 26 | No Silane | 3 |

This example illustrates that good rubber-to-glass adhesion is obtained using gamma-carboxypropyl trimethoxysilane, as a treating agent for the glass fibers, and that the ability of this silane to increase adhesion is markedly enhanced when it is partially hydrolyzed.

*Example 8*

Oftentimes the rubber composition is applied to the fiber glass composition in the form of a latex or cement. In such instances, the silane coupling agent is applied to the glass either before the rubber composition is applied or it is applied simultaneously with the rubber latex or cement. In this latter case, it is particularly desirable that the silane should be partially hydrolyzed in order to lessen its solubility in the deposited rubber composition and thereby to increase the tendency of the silane to migrate to the glass. The following data illustrate the effectiveness of treating glass with a partially hydrolyzed silane, in the presence of a rubber cement. The compositions used in these runs are as follows:

|  | Base Compound | | |
| --- | --- | --- | --- |
|  | A | B | C |
| Paracril C [1] | 100 | 100 | 100 |
| Semi-reinforcing Furnace Black | 50 | 50 | 50 |
| Magnesium Oxide | 3 | 3 | 3 |
| Zinc Oxide | 5 | 5 | 5 |
| Stearic Acid | 1 | 1 | 1 |
| Aminox [1] | 0.5 | 0.5 | 0.5 |
| Sulfur | 1 | 1 | 1 |
| Tetramethyl Thiuram Monosulfide | 0.6 | 0.6 | 0.6 |
| Silane [2] | | 11.3 | |
| Partially Hydrolyzed Silane [3] | | | 11.3 |

[1] As described in Example 1.
[2] Gamma-aminopropyl triethoxysilane.
[3] 2/3 hydrolyzed gamma-aminopropyl triethoxysilane prepared as shown in Example 3.

|  | Cement | | |
| --- | --- | --- | --- |
|  | A (g.) | B (g.) | C (g.) |
| Base Compound A | 120 | | |
| Base Compound B | | 128.4 | |
| Base Compound C | | | 128.4 |
| Methyl Ethyl Ketone | 472 | 472 | 472 |

In preparing the base compound, the first six ingredients listed were masterbatched in a Banbury mixer; then the sulfur, accelerator, and silanes were incorporated to aliquot portions of the masterbatch by means of mill mixing technique. The base compounds were then cut into coarse strips and dissolved in MEK by means of a mechanical shaker to form the cements. When examined after 40 hours on the shaker, the cements were found to be uniform and all of the base compounds had been completely taken up. The formula weights shown for cements B and C are such that the silane comprises 1.4 wt. percent of the total cement; and the remainder of the base compound comprises 20 wt. percent of the cement, which is the same concentration used for the control cement A.

The cements were then applied to glass roving as follows: Single-end roving was used consisting of 204 filaments of 0.0006" diameter to which butyl rubber had been applied as follows: After the filaments had been drawn, but before they had been gathered into a single end of the 204 filaments, the filaments were coated by means of passing over a roll with spongy cover that rotated in a bath of the butyl latex composition shown below:

Butyl latex MD–600–DC [1] _____ 100
Distilled water _____ 3049
Alipal CO–433 [2] _____ 1

[1] The butyl latex sold by Enjay Chemical Company contained 63% solids of which 61% was butyl rubber of 1.6 mol percent unsaturation and 2% was Alipal CO–433. In addition, the latex contained about 400 p.p.m. of formaldehyde.
[2] Alipal CO–433, sold by Antara Chemicals Div. of General Aniline & Film Corp., is the sodium salt of sulfated nonyl phenol polyethoxyethanol. There are 4 to 6 ethoxy groups per molecule.

In preparing the above composition, the Alipal was first added to the distilled water and this mixture was used to dilute the latex to obtain a composition of about 2% total solids in water.

After being coated with the above latex composition, the filaments were gathered into a single strand, called an end, and were dried at room temperature. The coating was sufficient to prevent the end from separating into individual filaments and thereby enabled the end to be subsequently handled as a discrete unit which could be brought to the next processing step to be described below.

The glass roving of 204 filaments per end as described above were then passed through a tubular oven at 750° F. to remove the butyl coating by means of pyrolysis. This enabled the filaments to be separated from one another so that the Paracril rubber cement compositions could surround the individual filaments. The equipment for applying the Paracril cement consisted of three rolls all of which were immersed to about 1/3 of their diameter in the cement. The pyrolyzed roving was passed over the first roll, under the second roll, and then over the third roll to insure good coating application. The roving was then passed through an oven set at 225° F. and through a 2.5 c.f.m. current of air at 177° F. for the purpose of drying the coating. A light dusting of zinc stearate was then applied and the roving was wound on a spool.

Examination under a microscope showed that the coating completely surrounded the individual filaments, and there appeared to be no difference in the behavior of cements A, B, and C in this respect. Such complete coating is desired to prevent the glass filaments from chafing against one another and breaking when subjected to dynamic uses such as the tension member of reinforced rubber belting or the carcass plies of tires.

In order to determine the adhesion properties of the cement coatings without weaving the coated roving into fabric, the following procedure was used: a 0.095" thick sheet of the Paracril rubber compound of Example 1 was spliced over a mandrel which was mounted on a lathe. The coated roving was then wound onto the rubber sheet closely such that the neighboring rovings touched each other to minimize flow of the rubber between the rovings during the subsequent curing operation, so that the subsequent adhesion test would not be unduly influenced by rubber to rubber bonds that might otherwise occur. After the roving had been wound on the rubber coated mandrel, another sheet of the Paracril rubber composition of Example 1 was spliced on. Thus, the roving was sandwiched between two layers of the rubber composition. This assembly was then cut off the mandrel and was cut into strips 2" wide by 6" long in such a manner that the roving ran in the lengthwise direction. This assembly was in turn sandwiched between two layers of canvas for the purpose of backing as described in Example 1. Also, as described in Example 1, a piece of Mylar film was inserted at one end of the sample between the coated roving and one of the layers of the sheeted Paracril rubber composition to provide an opening for the start of subsequent adhesion test. The sandwiched sample was then press cured in a mold for 15 minutes at 307° F. and 500 p.s.i.g. pressure on the mold. 1" wide specimens were then cut out of the sample for strip adhesion tests which were run on an Instron tester at a jaw separation rate of 2" per minute, with the following results:

| Sample No. | Cement | | Adhesion, Lbs. Pull/In. |
| --- | --- | --- | --- |
|  | Designation | Feature |  |
| 27 | A | No Silane | 3 |
| 28 | B | Unhydrolyzed Silane | 22 |
| 29 | C | Partially Hydrolyzed Silane | 41 |

This example shows that a rubbery composition deposited from cement can be adhered to glass if the cement contains a suitable silane such as gamma-aminopropyl triethoxysilane, and that the silane is twice as effective in aiding adhesion if it is partially hydrolyzed. This example also discloses the use of a temporary size of butyl rubber for the monofilament glass which size is removed by means of pyrolysis.

In preparing the Paracril rubber cement, it is possible to add the silanes with the solvent or to add the silane after the cements have been otherwise prepared. However, it has been found that if the silanes are incorporated into the rubber composition before the rubber composition has been subjected to solvent as was done in this example, then the subsequent cement will be of lower viscosity for the same solids content as compared to the aforesaid alternate silane addition technique.

The butyl rubber applied as the temporary size is preferably applied from aqueous media as in this example, in order that the binder can be applied to the individual filaments before the filaments are gathered into a strand. An inflammable solvent could be used but would not be appropriate at this locality. The butyl rubber latex could be used at full concentration as received, but in such case, more of the rubber than is required would be deposited on the filaments and the subsequent strands would have a tendency to be tackier than desired. A rubber content of 0.5 to 10%, preferably between 1 and 5% in the latex is satisfactory. Normally, when working with latex as dilute as 10% or less, it is necessary to add about 0.2 to 2 wt. percent of a conventional emulsifier or other suitable surfactant or stabilizer to prevent the rubber from settling out or coagulating. This is according to common technology in the latex art. In the case of the latex of the foregoing example, it is generally unnecessary to add protective agents with the latex diluted as low as 3% solids, but that protection is generally required at 2% or less solids dilution.

Butyl rubber size is preferred to conventional starch-oil sizings where the intent is subsequently to heat clean the glass because the butyl rubber is more easily and more completely removed. Upon being pyrolyzed, the butyl rubber is converted substantially to isobutylene gas which does not leave a soot deposit on the glass.

*Example 9*

These runs are similar to those shown in Example 8 except that the silanes were applied to the glass monofilaments in a separate step just prior to the application of cement.

The gamma-aminopropyl triethoxysilane and the partially hydrolyzed gamma-aminopropyl triethoxysilane that were used in Example 8 and that were prepared as shown in Example 3, were used as 1.4 wt. percent solutions in anhydrous methyl ethyl ketone. The ketone solution was contained in a three-roll coater as described in Example 8.

After the butyl coated glass roving of Example 8 was passed through the tubular oven to pyrolyze off the butyl rubber, as in Example 8, the roving was passed through the above coater where the ketone solution was applied. The roving was then passed overhead to dry off the ketone solvent with proper ventilation of the room. The roving was then brought to a similar coater containing the nitrile-rubber cement shown as cement A in Example 8. The application of this cement and subsequent steps, as well as the preparation of adhesion test specimens, were the same as in Example 8 with the following results:

| Sample No. | Silane | Adhesion, Lbs. Pull/In. |
|---|---|---|
| 30 | Unhydrolyzed Silane | 20 |
| 31 | Partially Hydrolyzed Silane | 43 |

Silanes reacted with the glass sufficiently when applied immediately prior to the rubber cement. Both silanes provided a good bond between the rubber and the glass, but the partially hydrolyzed silane was far superior so far as bonding of siliceous surfaces to rubber was concerned.

In regard to the extent of hydrolyzation, it is found that when the silane is hydrolyzed with amounts of water equivalent to effect 10 to 90% hydrolyzation, stronger bonding of the rubbery polymers to the silane treated siliceous surfaces is obtained as compared to the use of unhydrolyzed or 100% hydrolyzed silane, but hydrolyzation to the extent of 25 to 75% is generally preferred.

Having set forth the general nature and character of the invention, what is desired to be secured by Letters Patent is:

1. A process which consists essentially of the steps of:
    (a) adding sufficient water to a hydrolyzable silane to hydrolyze at least one, but not all, of the alkoxy groups in said hydrolyzable silane having the formula:

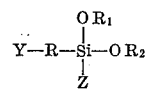

wherein R is selected from the group consisting of $C_1$–$C_5$ alkylene, aralkylene and arylene, Y is a reactive radical selected from the group consisting of amino, mercapto, carboxyl, cyano, hydroxy, epoxy, quinonyl, sulfonic acid and oxime, $R_1$ and $R_2$ are the same or different alkyl radicals containing from 1 to 2 carbon atoms, and Z is selected from the group consisting of $C_1$–$C_5$ alkyl groups, $OR_1$ or $OR_2$;
    (b) applying to the surfaces of siliceous materials a 0.1 to 10% anhydrous organic solvent solution of the partially hydrolyzed silane resulting from step (a); and
    (c) drying and removing the solvent from the resultant siliceous materials by heating at temperatures between 50° F. and 1000° F.

2. A process as in claim 1 wherein the hydrolyzable silane is gamma-aminopropyl triethoxysilane.

3. A process as in claim 1 wherein the hydrolyzable silane is gamma-mercaptopropyl trimethoxysilane.

4. A process as in claim 1 wherein the hydrolyzable silane is gamma-carboxypropyl trimethoxysilane.

5. A process as in claim 1 wherein the siliceous materials are selected from the group consisting of silica fillers and glass fibers.

6. A process as in claim 1 wherein the solvent treating solution also contains a rubbery polymer dissolved therein.

7. Siliceous materials whose surfaces are coated with a partially hydrolyzed silane, said coated siliceous materials being obtained by the steps consisting essentially of:
    (a) adding sufficient water to a hydrolyzable silane to hydrolyze at least one, but not all, of the alkoxy groups in said hydrolyzable silane having the formula:

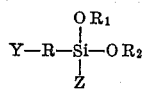

wherein R is selected from the group consisting of $C_1$–$C_5$ alkylene, aralkylene and arylene, Y, is a reactive radical selected from the group consisting of amino, mercapto, carboxyl, cyano, hydroxy, epoxy, quinonyl, sulfonic acid and oxime, $R_1$ and $R_2$ are the same or different alkyl radicals containing from 1 to 2 carbon atoms, and Z is selected from the group consisting of $C_1$–$C_5$ alkyl groups, $OR_1$ or $OR_2$;
    (b) applying to the surfaces of siliceous materials a 0.1 to 10% anhydrous organic solvent solution of the partially hydrolyzed silane resulting from step (a); and
    (c) drying and removing the solvent from the resultant siliceous materials by heating at temperatures between 50° F. and 1000° F.

8. Siliceous materials coated as in claim 7, wherein the hydrolyzable silane is gamma-aminopropyl triethoxysilane.

9. Siliceous materials coated as in claim 7, wherein the hydrolyzable silane is gamma-mercaptopropyl trimethoxysilane.

10. Siliceous materials coated as in claim 7, wherein the hydrolyzable silane is gamma-carboxypropyl trimethoxysilane.

11. Siliceous materials coated as in claim 7, wherein the siliceous materials are selected from the group consisting of silica and glass fibers.

12. Siliceous materials coated as in claim 7, wherein the solvent treating solution employed also contains a rubbery polymer dissolved therein.

13. A process for bonding rubbery polymers to siliceous materials which consists essentially of the steps of:
(a) adding sufficient water to a hydrolyzable silane to hydrolyze at least one, but not all, of the alkoxy groups in said hydrolyzable silane having the formula:

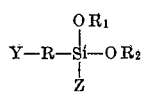

wherein R is selected from the group consisting of $C_1$–$C_5$ alkylene, aralkylene and arylene, Y is a reactive radical selected from the group consisting of amino, mercapto, carboxyl, cyano, hydroxy, epoxy, quinonyl, sulfonic acid and oxime, $R_1$ and $R_2$ are the same or different alkyl radicals containing from 1 to 2 carbon atoms, and Z is selected from the group consisting of $C_1$–$C_5$ alkyl groups, $OR_1$ or $OR_2$;
(b) applying to the surfaces of siliceous materials a 0.1 to 10% anhydrous organic solvent solution of the partially hydrolyzed silane resulting from step (a);
(c) drying and removing the solvent from the resultant siliceous materials by heating at temperatures between 50° F. and 1000° F.;
(d) contacting the dried, treated siliceous materials with a curable rubbery polymer; and
(e) curing the rubbery polymer while in contact with the dried, treated siliceous materials.

14. A process as in claim 13 wherein the rubbery polymer is at least one selected from the group consisting of butyl, chlorobutyl, bromobutyl, natural rubber, polyisoprene, polychloroprene, the copolymer of butadiene with acrylonitrile, the copolymer of butadiene with styrene, polybutadiene and the copolymer of ethylene with propylene.

15. A process as in claim 13 wherein the hydrolyzable silane is gamma-aminopropyl triethoxysilane.

16. A process as in claim 13 wherein the hydrolyzable silane is gamma-mercaptopropyl trimethoxysilane.

17. A process as in claim 13 wherein the hydrolyzable silane is gamma-carboxypropyl trimethoxysilane.

18. A process as in claim 13 wherein the siliceous materials are selected from the group consisting of silica fillers and glass fibers.

19. A process as in claim 13 wherein the solvent treating solution employed also contains a rubbery polymer dissolved therein.

20. Cured rubbery polymers containing siliceous materials prepared by the steps consisting essentially of:
(a) adding sufficient water to a hydrolyzable silane to hydrolyze at least one, but not all, of the alkoxy groups in said hydrolyzable silane having the formula:

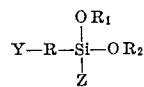

wherein R is selected from the group consisting of $C_1$–$C_5$ alkylene, aralkylene and arylene, Y is a reactive radical selected from the group consisting of amino, mercapto, carboxyl, cyano, hydroxy, epoxy, quinonyl, sulfonic acid and oxime, $R_1$ and $R_2$ are the same or different alkyl radicals containing from 1 to 2 carbon atoms, and Z is selected from the group consisting of $C_1$–$C_5$ alkyl groups, $OR_1$ or $OR_2$;
(b) applying to the surfaces of siliceous materials a 0.1 to 10% anhydrous organic solvent solution of the partially hydrolyzed silane resulting from step (a);
(c) drying and removing the solvent from the resultant siliceous materials by heating at temperatures between 50° F. and 1000° F.;
(d) contacting the dried, treated siliceous materials with a curable rubbery polymer; and
(e) curing the rubbery polymer while in contact with the dried, treated siliceous materials.

21. Cured rubbery polymers as in claim 20 wherein the rubbery polymer is at least one selected from the group consisting of butyl, chlorobutyl, bromobutyl, natural rubber, polyisoprene, polychloroprene, the copolymer of butadiene with acrylonitrile, the copolymer of butadiene with styrene, polybutadiene and the copolymer of ethylene with propylene.

22. Cured rubbery polymers as in claim 20 wherein the hydrolyzable silane is gamma-aminopropyl triethoxysilane.

23. Cured rubbery polymers as in claim 20 wherein the hydrolyzable silane is gamma-mercaptopropyl trimethoxysilane.

24. Cured rubbery polymers as in claim 20 wherein the hydrolyzable silane is partially hydrolyzed gamma-carboxypropyl trimethoxysilane.

25. Cured rubbery polymers as in claim 20 wherein the siliceous materials are selected from the group consisting of silica fillers and glass fibers.

26. Cured rubbery polymers as in claim 20 wherein the solvent treating solution employed also contains a rubbery polymer dissolved therein.

References Cited

UNITED STATES PATENTS

| | | |
|---|---|---|
| 2,751,369 | 6/1956 | TeGrotenhuis _____ 260—41.5 |
| 2,763,573 | 9/1956 | Biefeld _____ 117—72 |
| 2,832,754 | 4/1958 | Jex et al. |
| 2,859,198 | 11/1958 | Sears et al. |
| 2,943,103 | 6/1960 | Jex et al. _____ 117—126 |
| 3,228,903 | 1/1966 | Dennis _____ 117—126 |

MORRIS LIEBMAN, *Primary Examiner.*

ALLAN LIEBERMAN, *Examiner.*